United States Patent
Li et al.

(10) Patent No.: US 7,834,569 B2
(45) Date of Patent: Nov. 16, 2010

(54) TYPE OF STEPPER MOTOR DRIVER INTEGRATED CIRCUIT

(75) Inventors: Li Li, Shenzhen (CN); Deqin Wu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 538 days.

(21) Appl. No.: 11/852,259

(22) Filed: Sep. 7, 2007

(65) Prior Publication Data

US 2008/0061725 A1 Mar. 13, 2008

(30) Foreign Application Priority Data

Sep. 7, 2006 (CN) .................. 2006 1 0062503

(51) Int. Cl.
*H02P 6/00* (2006.01)
(52) U.S. Cl. ................... 318/400.29; 318/567; 318/696
(58) Field of Classification Search ............ 318/400.29, 318/567, 696, 685; 365/63; 710/11; 347/236
See application file for complete search history.

(56) References Cited

U.S. PATENT DOCUMENTS 6,832,729 B1 * 12/2004 Perry et al. ............ 235/472.01
2003/0009610 A1 * 1/2003 Nolan et al. ................... 710/72
2003/0179598 A1 * 9/2003 Chen ........................... 365/63
2006/0271825 A1 * 11/2006 Keaffaber et al. ............. 714/38

* cited by examiner

*Primary Examiner*—Karen Masih
(74) *Attorney, Agent, or Firm*—Venture Pacific Law, PC

(57) ABSTRACT

This invention discloses a type of stepper motor driver integrated circuit, comprising of a control logic circuit module and a connected stepper motor driver circuit module. The outputs, in groups of two, of the stepper motor driver circuit module are connected to the two ends of coil windings in the stepper motor. Its characteristic is that it is equipped with an I²C serial bus connection which allows the main controller of I²C bus to directly connect to the control logic circuit module via the SDA, SCL, and GND lines resulting in duplex data transmission. With fewer number of signal ports, more driver integrated circuits can also be connected to the same I²C bus. Each driver integrated circuit can directly drive a stepper motor and it can also drive different numbers of stepper motors using different channels. In particular, the multi-channel stepper motor driver integrated circuit has fewer input contact points and thus it clearly reduces the chip area as well as the manufacturing cost which allows the chip to be used in a wide range of digital equipment and electronic information products where space is limited such as with cellular phone photo modules.

17 Claims, 5 Drawing Sheets

TYPE OF STEPPER MOTOR DRIVER INTEGRATED CIRCUIT

CROSS REFERENCE

This application claims priority from a Chinese patent application entitled "A Type of Stepper Motor Driver IC" filed on Sep. 7, 2006, having a Chinese Application No. 200610062503.7. This Chinese application is incorporated here by reference.

FIELD OF INVENTION

This invention involves motor driver circuits, and in particular to a type of stepper motor driver integrated circuits using a two-line serial bus connection.

BACKGROUND

Using an unified standard bus structure makes it easier to interconnect different equipment and also allows for convenient expansion of components and equipment. A type of inter-integrated circuit (also known as $I^2C$ or Inter-IC) bus developed by Philips company is used as a first level internal serial bus for integrated circuits. Compared to the conventional parallel bus system, there are fewer transmission lines between the main controller and each peripheral component or slave device. The three lines include a serial data line SDA, a serial clock line SCL, and a ground GND. The $I^2C$ bus has a strong anti-interference ability, fast speed, and it is easy to allow for system expansion as well as to standardize modular design. However, the conventional stepper motor, including the driver integrated circuit of the stepper motor for a cellular phone photo module driver control system, has yet to be equipped with the $I^2C$ serial bus; instead, it uses a parallel input which has more signal ends resulting in more input contact points with the chip and thus occupying significant chip area and limiting application of the driver integrated circuit to have certain space requirement. Moreover, the driver integrated circuit that uses the parallel connection needs to take up the main controller input and output connections. Since the number of input and output connections in the main controller are limited, additional expansion components are required for the conventional stepper motor resulting in cost increase.

SUMMARY OF INVENTION

It is an object of this invention to provide a type of stepper motor driver integrated circuit that would clearly reduce cost and space requirement.

It is another object of this invention to provide a circuit with an $I^2C$ serial bus connection which can directly connect to the main controller of the $I^2C$ bus when necessary.

It is still another object of this invention to provide a multi-channel driving stepper motor IC having fewer input contact points and thus reducing the chip area as well as the manufacturing cost.

Briefly, a type of stepper motor driver integrated circuit is disclosed, having a control logic circuit module and a connected stepper motor driver circuit module. The outputs, in groups of two, of the stepper motor driver circuit module are connected to the two ends of coil windings in the stepper motor. The characteristics of this type of stepper motor driver integrated circuit are: it is equipped with an $I^2C$ serial bus connection; one end of the three lead wires of the said $I^2C$ serial bus are connected separately with the SDA signal input, SCL signal input, and GND of the said control logic circuit module; the other end of the three lead wires of the serial connection are connected to the SDA signal output, SCL signal output, and GND of the $I^2C$ main controller bus. This results in duplex data transmission between the $I^2C$ main controller bus and the control logic circuit module. Through the stepper motor drive circuit module, it can control the stepper motor in the forward rotation state, the reverse rotation state or the standby state.

An advantage of this invention is that it provides a circuit with an $I^2C$ serial bus connection which can directly connect to the main controller of the $I^2C$ bus when necessary.

Another advantage of this invention is that it provides a multi-channel driving stepper motor IC having fewer input contact points and thus reducing the chip area as well as the manufacturing cost.

DESCRIPTION OF DRAWINGS

The foregoing and other objects, aspects and advantages of the invention will be better understood from the following detailed description of the preferred embodiments of this invention when taken in conjunction with the accompanying drawings in which.

DETAILED DESCRIPTION OF THE PREFERRED EMBODIMENTS

Figure 1:
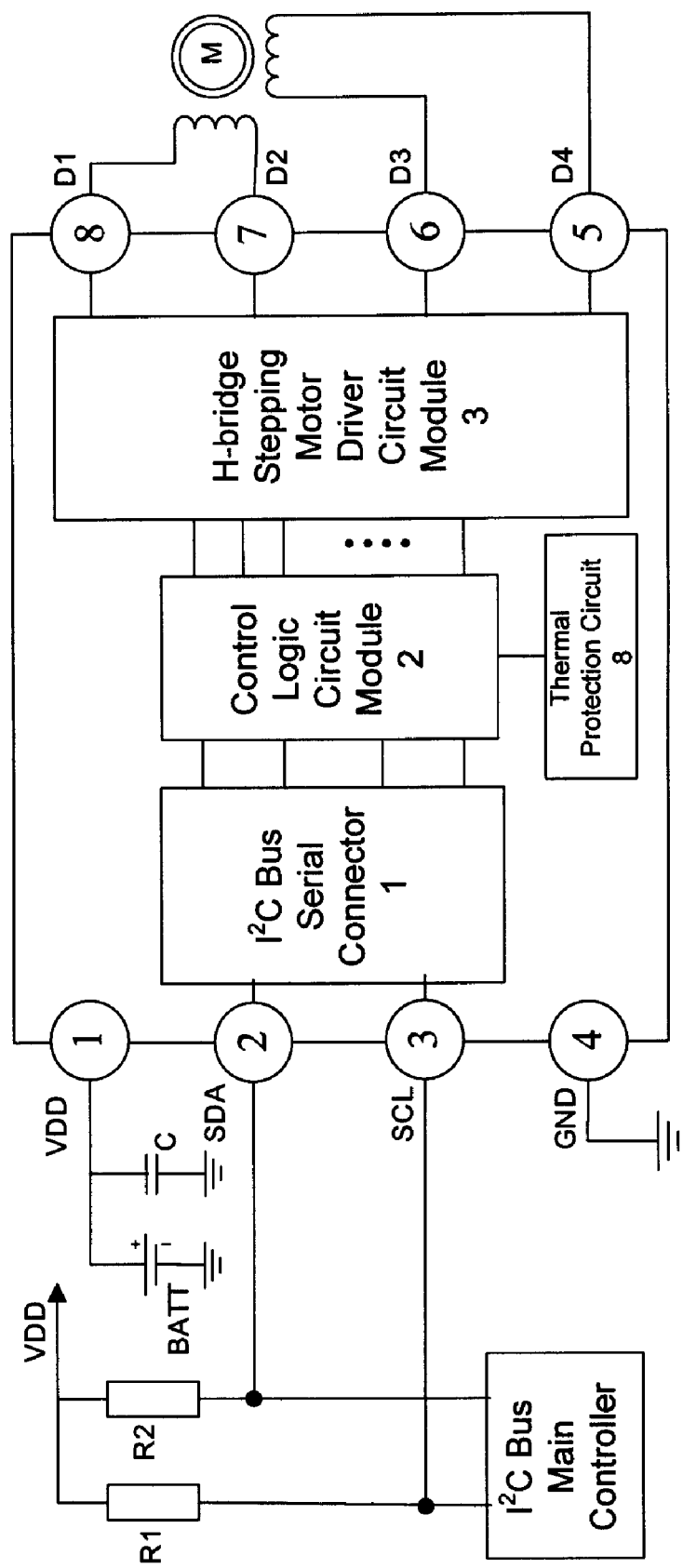
FIG. 1 is an embodiment of the circuit block diagram of this invention.

The presently preferred embodiment of the present invention provides a type of stepper motor driver integrated circuit having a control logic circuit module and a connected stepper motor driver circuit module. The outputs, in groups of two, of the stepper motor driver circuit module are connected to the two ends of coil windings in the stepper motor.

The characteristics of this type of stepper motor driver integrated circuit are: it is equipped with an $I^2C$ serial bus connection. One end of the three lead wires of the said $I^2C$ serial bus are connected separately with the SDA signal input, SCL signal input, and GND of the said control logic circuit module. The other end of the three lead wires of the serial connection are connected to the SDA signal output, SCL signal output, and GND of the $I^2C$ main controller bus. This results in duplex data transmission between the $I^2C$ main controller bus and the control logic circuit module. Through the stepper motor drive circuit module, it can control the stepper motor in the forward rotation state, the reverse rotation state or the standby state.

The stepper motor driver circuit module is an H-bridge stepper motor driver module. The H-bridge stepper motor driver module is comprised of two large W/L ratio NMOS FET and two large W/L ratio PMOS FET in order to provide larger electric current needed for the stepper motor normal operation. The amount of current passing through MOS FET is proportional to its W/L ratio. The large W/L ratio NMOS FET and PMOS FET have smaller internal conduction resistance and thus it can strengthen the driving force of the stepper motor.

Both NMOS FET and PMOS FET of the H-bridge stepper motor driver module have a parasitic diode at the source and drain. The purpose is to alleviate the reverse spike voltage created by the increase or decrease in the electric current through the stepper motor coil, preventing the NMOS FET and PMOS FET from breaking down.

The control logic circuit module includes a Schmitt trigger for logic level reshaping that is connected to the main controller of I²C bus; a logic delay circuit; and a driver module that is connected to both the stepper motor drive circuit module and the logic delay circuit; and the Schmitt trigger is connected to the logic delay circuit. The logic levels from the main controller of the I²C bus are reshaped to prevent the logic delay circuit from error in operation.

The logic delay circuit is composed of large channel devices. The delay time is approximately 1 μs causing the same side NMOS FET and PMOS FET of the H-bridge stepper motor circuit module to delay turn-on or delay cut-off, in order to satisfy the condition that while the stepper motor toggles to an operational state, the same side NMOS FET and PMOS FET cannot simultaneously have a turn-on or a delay demand. This clearly reduces the power consumption of the integrated circuit. The logic delay circuit does not use a delay capacitor and thus the layout area of the integrated circuit is significantly reduced.

The advantages of this invention as compared to the conventional technology are: this invention is equipped with an I²C serial bus connection which can directly connect to the main controller of the I²C bus when necessary. With fewer number of signal ports, more driver integrated circuits can also be connected to the same I²C bus. Each driver integrated circuit can directly drive a stepper motor and it can also drive different number of stepper motors using different channels. In particular, the multi-channel driving stepper motor IC has fewer input contact points and thus it clearly reduces the chip area as well as the manufacturing cost which allows the chip to be used in a wider range of digital equipment and electronic information products where space is limited such as cellular phone photo modules.

Embodiments

In one application, a type of stepper motor driver integrated circuit used in cellular phone photo modules can be achieved.

As the stepper motor driver integrated circuit shown in FIG. 1, it includes a control logic circuit module 2 and a connected H-bridge stepper motor driver module 3.

It is equipped with an I²C serial bus connection 1. One end of the three lead wires of the I²C serial bus connection 1 are connected separately with the SDA signal input, SCL signal input, and GND of the said control logic circuit module. The other end of the three lead wires of the said I²C serial bus connection 1 are connected to the SDA signal output, SCL signal output, and GND of the main controller I²C bus 4. This results in duplex data transmission between the main controller of the I²C bus and the control logic circuit module. Through the said H-bridge stepper motor driver circuit module 2, it can control the stepper motor M in the forward rotation state, reverse rotation state, or standby state. R1 and R2 in the figure are pull-up resistors that set the I²C bus at high level and they are essential parts of the I²C bus. BATT is a power source and C is a filter capacitor.

Figure 2:
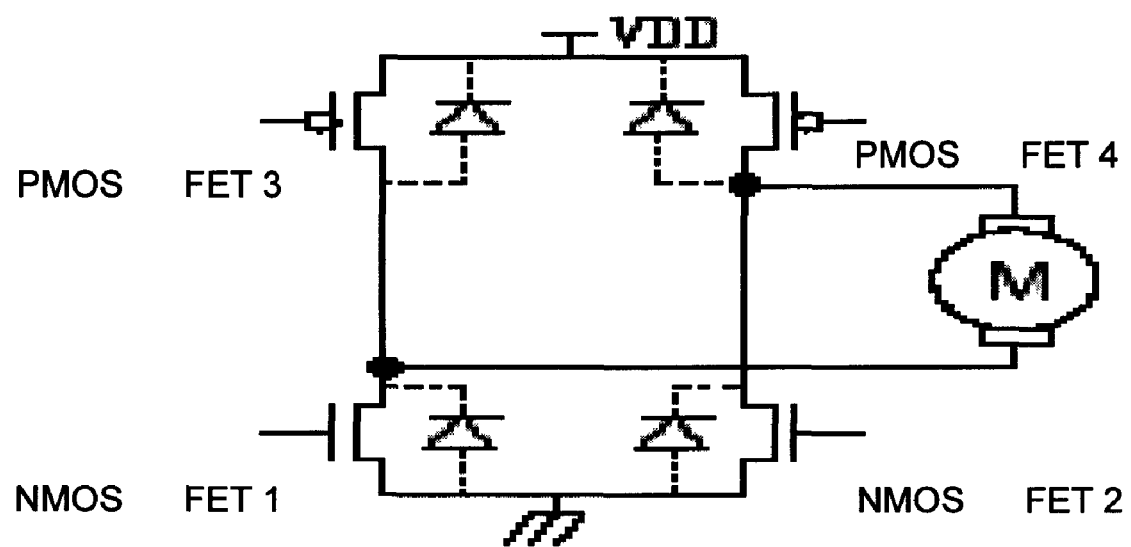
FIG. 2 is an H-bridge motor driver circuit block diagram of this invention.

As shown in FIG. 2, the H-bridge stepper motor driver circuit module 3 is comprised of large aspect ratio NMOS FET1, 2 and PMOS FET3, 4. Their outputs 5, 6, and 7, 8 are connected separately with the two ends D4, D3 and D2, and D1 of the coil windings in the stepper motor M. Both NMOS FET1, 2 and PMOS FET3, 4 have a parasitic diode at source and drain for releasing any reverse spike voltage.

Figure 3:
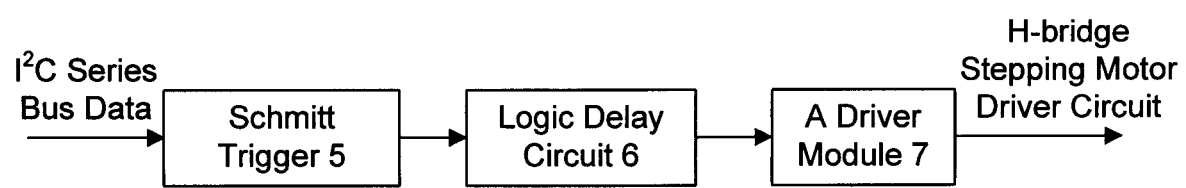
FIG. 3 is an embodiment of the control logic circuit module diagram of this invention.

As shown in FIG. 3, the control logic circuit module 2 includes a Schmitt trigger for logic level reshaping that is connected to the main controller of I²C bus 4; a logic delay circuit 6; and a driver module 7 that is connected to both the H-bridge stepping motor driver circuit module 3 and the logic delay circuit 6; and the Schmitt trigger 5 is connected to the logic delay circuit 6. Thus the logic levels from the main controller of I²C bus 4 are reshaped to prevent the logic delay circuit 6 from error in operation.

The said logic delay circuit 6 is comprised of large channel device causing the same side NMOS FET1 and PMOS FET3 and NMOS FET2 and PMOS FET4 of the H-bridge stepper motor driver the circuit module 3 to separately delay turn-on and cut-off by b 1 μs; in order to satisfy the condition that while the stepper motor toggles to an operational state, the same side NMOS FET and PMOS FET cannot simultaneously have a turn-on or a delay demand. This clearly reduces the power consumption of the integrated circuit. The logic delay circuit does not use a delay capacitor and thus the layout area of the integrated circuit is significantly reduced.

As shown in FIG. 1, the stepper motor driver integrated circuit also comprises of a thermal protection circuit 8. The thermal protection circuit 8 includes a bandgap reference voltage source, a temperature measuring module with a serial diode and a hysteresis comparator. The outputs of the bandgap reference voltage source and the thermal measuring module are connected separately to the two inputs of the hysteresis comparator. The hysteresis comparator output is connected to the control end of the control logic circuit module.

Figure 4:
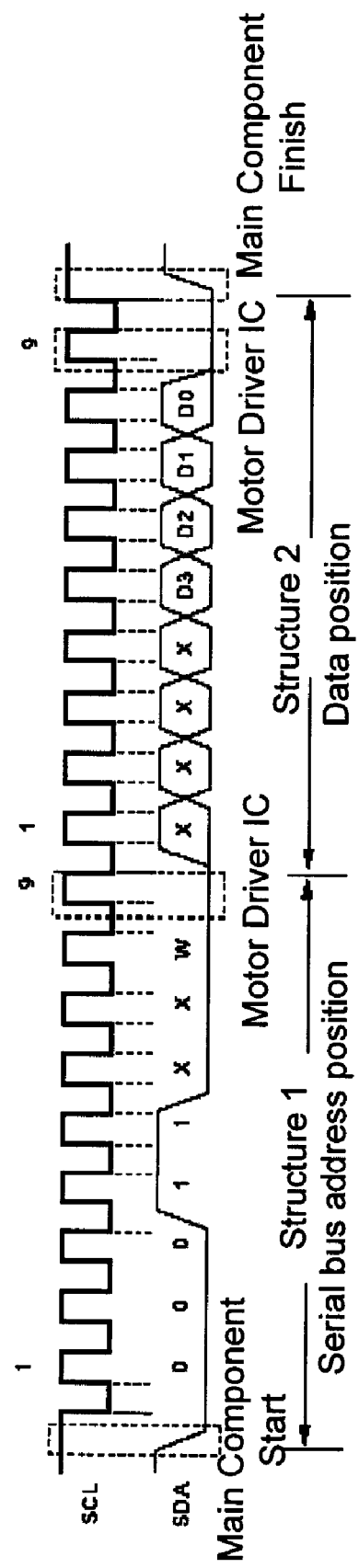
FIG. 4 is an embodiment of the write operation of this invention.
Figure 5:
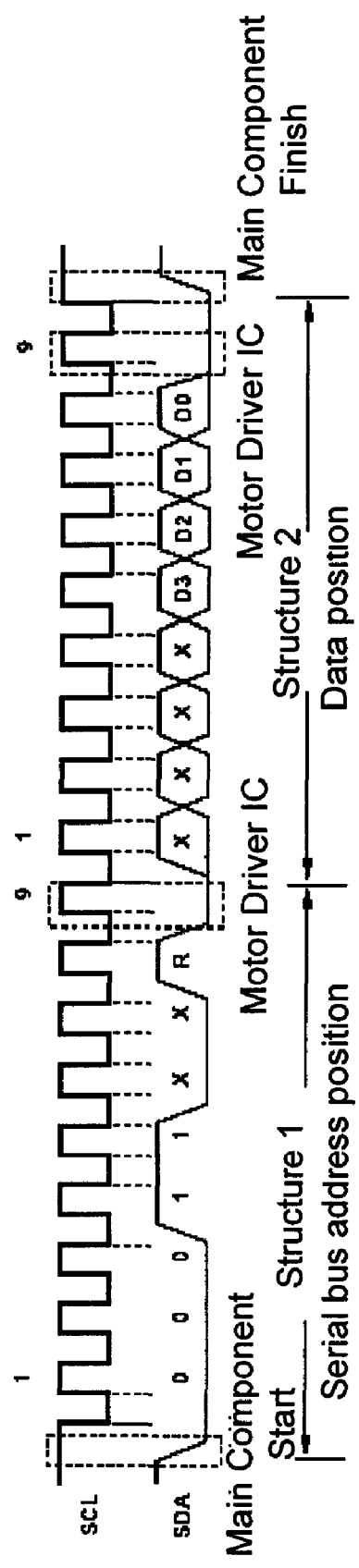
FIG. 5 is the embodiment of the read operation of this invention.

FIGS. 4 and 5 show the write and read operation protocol of the I²C module. The embodiment of the stepper motor driver integrated circuit of this invention has not only address recognition but also act as a receiver. The chip has a seven digit address 0001-1xx; the 8$^{th}$ digit immediately next to the address position is data direction (read/write) where "0" represents sending data (write), and "1" represents requesting data (read).

The embodiment of the stepper motor driver integrated circuit of this invention can attain standby, forward rotation and reverse rotation of the stepper motor and can maintain the previous forward rotating or reverse rotating state. The pattern relationship between a two channel stepper motor input data and the corresponding states is shown in Table 1.

TABLE 1

| Y1, Y3 | Y2, Y4 | State |
|---|---|---|
| L | L | Standby |
| H | L | Forward Rotation |
| L | H | Reverse Rotation |
| H | H | Maintain the previous forward rotating or reverse rotating state |

In Table 1: L is low level, H is high level. Yn (n=1~4) is effective data bit that corresponds to the input level state of the two coil winding ends Dn in a two channel stepper motor M.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

We claim:

1. A motor driver circuit operating a motor having one or more coil windings, comprising:
    a control logic circuit module;
    an H-bridge stepper motor driver circuit module connecting to said control logic circuit module, wherein the outputs of the stepper motor driver circuit module connected to the coil windings in the motor, wherein said H-bridge stepper motor driver circuit module comprises at least two NMOS FET and at least two PMOS FET; and
    an inter-integrated circuit serial bus connection having a main controller.

2. The motor driver circuit of claim 1 wherein the inter-integrated circuit serial bus connection having three lead wires with two ends; wherein one end of the three lead wires of the said inter-integrated circuit serial bus connecting to a SDA signal input, a SCL signal input, and ground of the control logic circuit module; and wherein the other end of the three lead wires of the serial connection are connected to a SDA signal output, a SCL signal output, and ground of the main controller of inter-integrated circuit bus.

3. The motor driver circuit of claim 1 wherein there is duplex data transmission between the main controller of inter-integrated circuit serial bus and the control logic circuit module.

4. The motor driver circuit of claim 1 wherein through the stepper motor driver circuit module, it controls the motor in a forward state, a reverse state and a standby state.

5. The motor driver circuit of claim 1 wherein the NMOS FET and PMOS FET of the H-bridge stepper motor driver circuit module each having a parasitic diode at source and drain.

6. The motor driver circuit of claim 1 wherein the control logic circuit module includes a logic level reshaping Schmitt trigger that is connected to the main controller of inter-integrated circuit bus, a logic delay circuit, and a driver module that is connected to both the stepper motor drive circuit module and the logic delay circuit, where the Schmitt trigger is connected to the logic delay circuit.

7. The motor driver circuit of claim 6 wherein the logic delay circuit is comprised of long trench field effect components.

8. The motor driver circuit of claim 1 wherein the stepper motor driver circuit is equipped with a thermal-protection circuit.

9. The motor driver circuit of claim 8 wherein the thermal-protection circuit includes a bandgap reference voltage source, a thermal measuring module, and a hysteresis comparator.

10. The motor driver circuit of claim 9 wherein the bandgap reference voltage source and the thermal measuring module outputs are connected to two inputs of the hysteresis comparator, and the hysteresis comparator output is connected to the control logic circuit module.

11. A motor driver circuit operating a motor having one or more coil windings, comprising:
    a control logic circuit module;
    a stepper motor driver circuit module connecting to said control logic circuit module, wherein the outputs of the stepper motor driver circuit module connected to the coil windings in the motor; and
    an inter-integrated circuit serial bus connection having a main controller;
    wherein the inter-integrated circuit serial bus connection having three lead wires with two ends; wherein one end of the three lead wires of the said inter-integrated circuit serial bus connecting to a SDA signal input, a SCL signal input, and ground of the control logic circuit module; and wherein the other end of the three lead wires of the serial connection are connected to a SDA signal output, a SCL signal output, and ground of the main controller of inter-integrated circuit bus.

12. The motor driver circuit of claim 11 wherein the said motor driver circuit module is an H-bridge stepper motor driver circuit module.

13. The motor driver circuit of claim 12 wherein H-bridge stepper motor driver circuit module is comprised of two large W/L ratio NMOS FET and two large W/L ratio PMOS FET.

14. The motor driver circuit of claim 11 wherein the control logic circuit module includes a logic level reshaping Schmitt trigger that is connected to the main controller of inter-integrated circuit bus, a logic delay circuit, and a driver module that is connected to both the stepper motor drive circuit module and the logic delay circuit, where the Schmitt trigger is connected to the logic delay circuit.

15. The motor driver circuit of claim 11 wherein the stepper motor driver circuit is equipped with a thermal-protection circuit.

16. The motor driver circuit of claim 15 wherein the thermal-protection circuit includes a bandgap reference voltage source, a thermal measuring module, and a hysteresis comparator; wherein the bandgap reference voltage source and the thermal measuring module outputs are connected to two inputs of the hysteresis comparator, and the hysteresis comparator output is connected to the control logic circuit module.

17. A motor driver circuit operating a motor having one or more coil windings, comprising:
    a control logic circuit module;
    a stepper motor driver circuit module connecting to said control logic circuit module, wherein the outputs of the stepper motor driver circuit module connected to the coil windings in the motor; and
    an inter-integrated circuit serial bus connection having a main controller;
    wherein the inter-integrated circuit serial bus connection having three lead wires with two ends; wherein one end of the three lead wires of the said inter-integrated circuit serial bus connecting to a SDA signal input, a SCL signal input, and ground of the control logic circuit module; and wherein the other end of the three lead wires of the serial connection are connected to a SDA signal output, a SCL signal output, and ground of the main controller of inter-integrated circuit bus;
    wherein there is duplex data transmission between the main controller of inter-integrated circuit serial bus and the control logic circuit module;
    wherein through the stepper motor driver circuit module, it controls the motor in a forward state, a reverse state and a standby state;
    wherein the said motor driver circuit module is an H-bridge stepper motor driver circuit module and is comprised of two large W/L ratio NMOS FET and two large W/L ratio PMOS FET;
    wherein the control logic circuit module includes a logic level reshaping Schmitt trigger that is connected to the main controller of inter-integrated circuit bus, a logic delay circuit, and a driver module that is connected to both the stepper motor drive circuit module and the logic delay circuit, where the Schmitt trigger is connected to the logic delay circuit; and wherein the stepper motor driver circuit is equipped with a thermal-protection circuit; wherein the thermal-protection circuit includes a bandgap reference voltage source, a thermal measuring module, and a hysteresis comparator; and wherein the bandgap reference voltage source and the thermal measuring module outputs are connected to two inputs of the hysteresis comparator, and the hysteresis comparator output is connected to the control logic circuit module.

* * * * *